No Printed Specification Available
1259X
D. CLARK.
FUNNEL.
Patented Apr. 9, 1810.
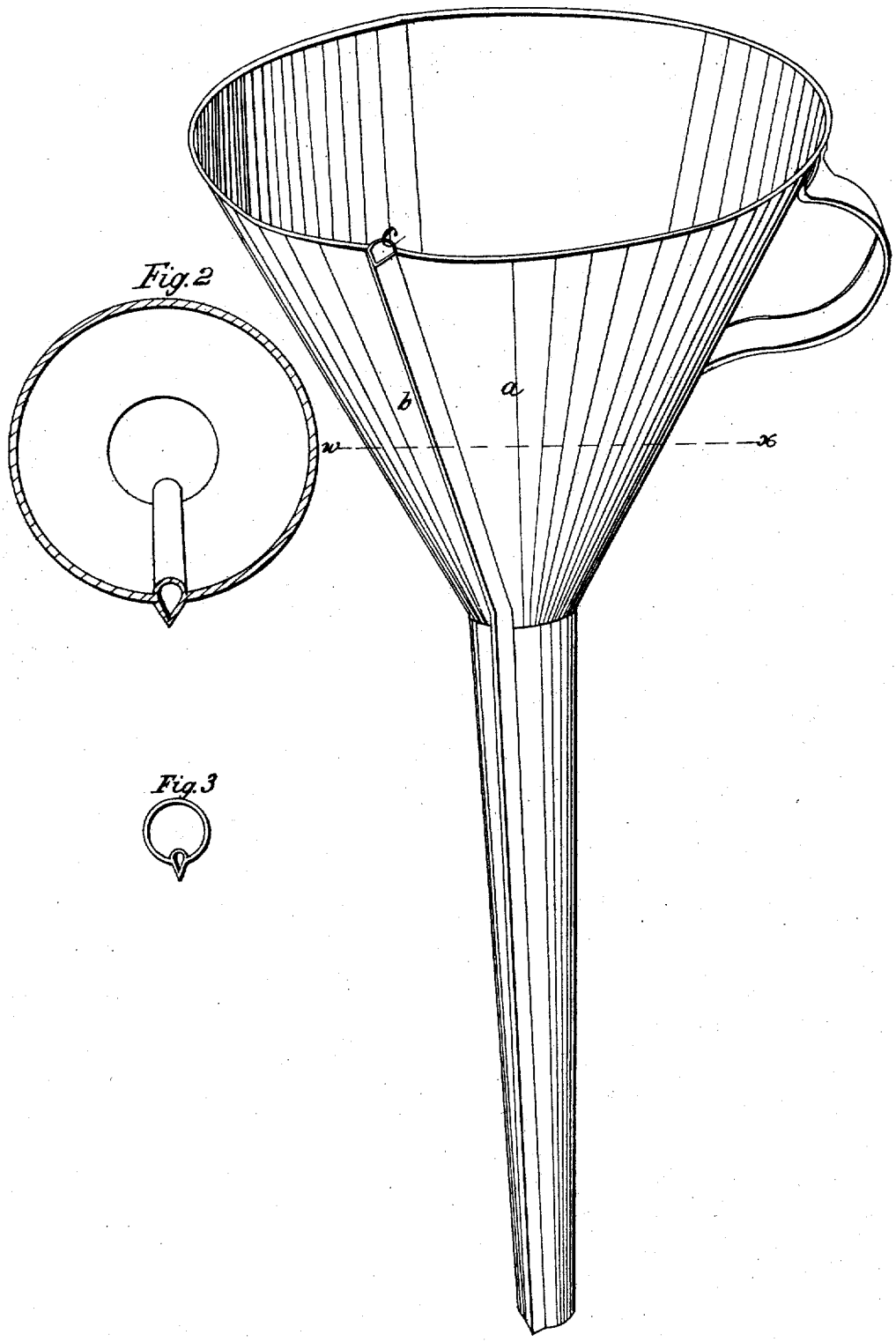
THE NORRIS PETERS CO., PHOTO-LITHO., WASHINGTON, D. C.

1259X

April 9, 1810

449

David Clark, a Citizen of ,

Letters Patent.

The Schedule referred to in these Letters Patent and making part of the same, containing a description in the words of the said David Clark himself of his Marble and pipe Stone turner.

There is a vertical cogwheel on a horizontal shaft of this Machine which is turned by water or other force and communicates motion to a trundle head standing upright this trundle head turns by a Bett or small spur wheel or vertical auger for boring stone for pipes for aqueducts or other purposes and it also turns the bit, or instrument for boring out the hollows in stone vessels of every description by means of a spur wheel and pinion on the perpendicular shaft of the bit, The stone to be bored by this last mentioned bit is placed in a box or trough of water under the bit. On one side of the Machine is an Horizontal Lathe, turned by a strap which passes round the first verticle wheel and round a wheel or pully on the maundrel of the Lathe the rest for the chissel or turning tool is secured to the tool and projects beneath it. In all cases where a trough of water can be used for the stone to lie in whilst turned or cut it must be so placed; and in other cases kept constantly wet during the operation. This Machine is for manufactoring Bowls, plates, Mortars and Mugs or flat or hollow ware of every description out of stone or marble as also for boring and turning aqueduct pipes, Bannesters Urns &c. The number and kind of bits or bores are varied according to circumstances.

Witnesses present
Nichs. King
William Thornton
293 words

David Clark

Exd. WT